(12) United States Patent
Parker et al.

(10) Patent No.: US 7,450,364 B2
(45) Date of Patent: Nov. 11, 2008

(54) AUTOMATIC STATIC GROUNDING DEVICE FOR ELECTRICAL COMPONENTS

(75) Inventors: Paul Kimball Parker, Wexford, PA (US); James Edward Smith, Pittsburgh, PA (US); Paul Anthony Colbaugh, Allison Park, PA (US); Ronald Alan Carder, Pittsburgh, PA (US); Douglas Michael Brandt, Wampum, PA (US)

(73) Assignee: Eaton Corporation, Cleveland, OH (US)

( * ) Notice: Subject to any disclaimer, the term of this patent is extended or adjusted under 35 U.S.C. 154(b) by 242 days.

(21) Appl. No.: 11/536,777

(22) Filed: Sep. 29, 2006

(65) Prior Publication Data

US 2008/0080117 A1 Apr. 3, 2008

(51) Int. Cl.
*H05F 3/00* (2006.01)
(52) U.S. Cl. ...................................... 361/220; 361/221

(58) Field of Classification Search ................. 361/212, 361/220, 221; 200/50.21
See application file for complete search history.

*Primary Examiner*—Michael J Sherry
*Assistant Examiner*—Danny Nguyen
(74) *Attorney, Agent, or Firm*—Martin J. Moran

(57) ABSTRACT

A grounding device for a roll-out electrical component is provided. The grounding device includes an actuation assembly, a static grounding contact assembly, and a biasing device. The actuation assembly structured to be engaged/disengaged by a roll-out electrical component. The static grounding contact assembly has at least one static grounding contact member that is structured to move between a first position, wherein the static grounding contact member does not contact a roll-out electrical component at least one contact, and a second position, wherein the static grounding contact member contacts, and is in electrical communication with, the roll-out electrical component at least one contact. The static grounding contact assembly is coupled to the actuation assembly and responsive to the position of the roll-out electrical component. The biasing device is structured to bias the actuation assembly and the static grounding contact member to their respective first positions.

20 Claims, 4 Drawing Sheets

AUTOMATIC STATIC GROUNDING DEVICE FOR ELECTRICAL COMPONENTS

BACKGROUND OF THE INVENTION

1. Field of the Invention

The present invention relates to a housing assembly for an electrical component and, more specifically, to a housing assembly having an automatic grounding device.

2. Background Information

Electrical components, especially high voltage components, are typically disposed in a protective housing assembly. The housing assembly includes a plurality of sidewalls defining an enclosed space in which the electrical component is disposed. An electrical conduit or other voltage source extends into the enclosed space. The housing assembly includes an external voltage source conductor that extends between, and is in electrical communication with, the voltage source and the electrical component. The housing assembly further includes a set of rails. The electrical component, typically, includes a set of wheels structured to engage the rails. Thus, the electrical component may be moved into, or out of, the enclosed space by rolling over the rails.

There is a danger, however, that the electrical component may retain a static charge after the electrical component has been disconnected from the voltage source. This static charge can be dangerous if not discharged prior to the time a person contacts the electrical component. Therefore, there is a need for a grounding device for a roll-out electrical component housing assembly. There is a further need for a grounding device that may be incorporated into a typical housing assembly without excessive modification to the housing assembly. There is a further need for a grounding device that operates automatically each time the electrical component is removed from the housing assembly.

SUMMARY OF THE INVENTION

These needs, and others, are met by at least one embodiment of the disclosed invention which provides a grounding device having an actuation assembly, a static grounding contact assembly, and a biasing device. The roll-out electrical component is structured to move on a pair of housing assembly rails between a first, installed position, wherein the roll-out electrical component is disposed within the enclosed space and coupled to an external voltage source conductor; an intermediate position, wherein the roll-out electrical component is partially disposed in the enclosed space and is not coupled to the external voltage source conductor; and a second position, wherein the roll-out electrical component is not substantially disposed within the enclosed space and is not coupled to the external voltage source conductor. The actuation assembly is structured to be engaged by the roll-out electrical component and structured to move between a first position and a second position, the actuation assembly being in the first position when the roll-out electrical component is in the first, installed position, the actuation assembly being in the second position when the roll-out electrical component is in the intermediate position. The static grounding contact assembly has at least one static grounding contact member structured to move between a first position, wherein the static grounding contact member does not contact the roll-out electrical component, and a second position, wherein the static grounding contact member contacts, and is in electrical communication with, the roll-out electrical component, the static grounding contact member being in the first position when the roll-out electrical component is in the first, installed position, the static grounding contact member being in the second position when the roll-out electrical component is in the intermediate position. Thus, as the roll-out electrical component is being removed from the enclosed space, the static grounding contact assembly contacts the roll-out electrical component and discharges any static charge.

BRIEF DESCRIPTION OF THE DRAWINGS

A full understanding of the invention can be gained from the following description of the preferred embodiments when read in conjunction with the accompanying drawings in which:

FIG. 1A shows a roll-out electrical component in a first, installed position, FIG. 1B shows a roll-out electrical component partially removed from a housing assembly, FIG. 1C shows a roll-out electrical component at an intermediate position, and FIG. 1D shows a roll-out electrical component in a second position, wherein the roll-out electrical component is not substantially disposed within the housing assembly.

DESCRIPTION OF THE PREFERRED EMBODIMENTS

Figure 1A:
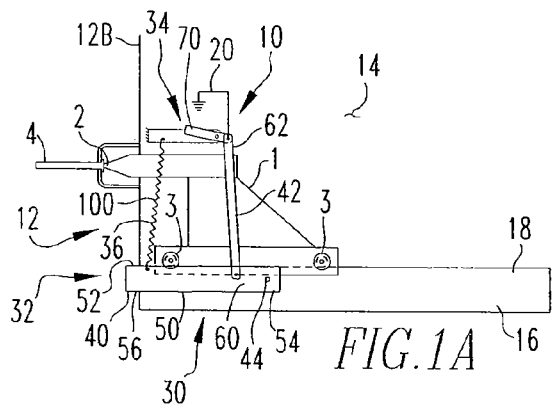
FIGS. 1A-1D show, schematically, a roll-out electrical component being removed from a housing assembly and, more specifically.
Figure 1B:
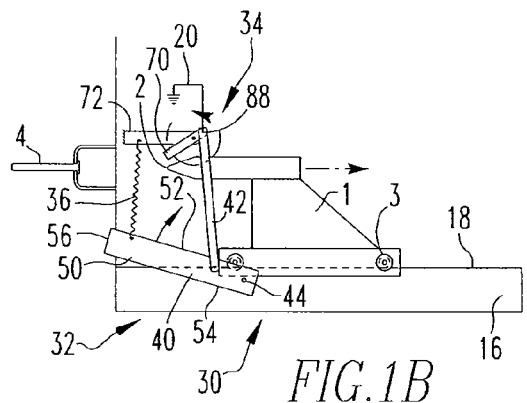

As used herein, a "roll-out electrical component" is an electrical component such as, but not limited to, a voltage transformer, control power transformer, and fuses.

As used herein, directional terms, e.g., "above," "below," "upper," "lower," etc., are used for convenience relative to the Figures and are not intended to limit the claims.

As used herein, "coupled" means a link between two or more elements, whether direct or indirect, so long as a link occurs.

As shown in FIGS. 1A-1D and 2, a roll-out electrical component 1 includes at least one contact 2 structured to be coupled to a voltage source and a plurality of wheels 3 structured to engage the housing assembly rails 16, described below. As further described below, one wheel 3, preferably a wheel 3 adjacent to the back sidewall 12B, described below, has an extended axle 5 (FIG. 3), or another extension extending generally parallel to the axle. The roll-out electrical component 1 is structured to be removably disposed in an enclosed space 14 defined by a housing assembly 10. The at least one contact 2 is structure to engage, and be in electrical communication with, an external voltage source conductor 4, described below.

The housing assembly 10 includes a plurality of sidewalls 12 defining an enclosed space 14. One front sidewall 12A is structured to move thereby allowing access to the enclosed space 14 and allowing the roll-out electrical component 1 to be removed from the enclosed space 14. As shown, the front, movable sidewall 12A is a removable component, however, it is also typical to have the front, movable sidewall 12A pivotally coupled to the other sidewalls 12. The sidewall 12 opposite the front, movable sidewall 12A is the housing assembly back sidewall 12B. An external voltage source conductor 4 extends into the enclosed space 14. The external voltage source conductor 4 is coupled to, and in electrical communication with, an external voltage source (not shown). The housing assembly 10 may also include at least one conductive bus member (not shown). Such a bus member may extend from the external voltage source conductor 4 to a point inside the housing assembly 10. To allow the roll-out electrical component 1 to be easily moved, the housing assembly 10 includes a pair of rails 16. The rails 16 extend generally horizontally and in a generally parallel, spaced relation within the housing assembly 10. The rails 16 each have an upper surface 18. The roll-out electrical component wheels 3 are structured to engage the rail upper surface 18 and are, preferably, slightly wider than the rail upper surface 18. The housing assembly 10 also includes a ground connection 20 (schematically in FIGS. 1A-1D) which is a conductive member disposed within the enclosed space 14 and which is electrically grounded. In this configuration, the roll-out electrical component 1 is structured to move on the rails 16 between a first, installed position, wherein the roll-out electrical component 1 is disposed within the enclosed space 14 and coupled to the external voltage source conductor 4, an intermediate position, wherein the roll-out electrical component 1 is partially disposed in the enclosed space 14 and is not coupled to the external voltage source conductor 4, and a second position, wherein the roll-out electrical component 1 is not substantially disposed within the enclosed space 14 and is not coupled to the external voltage source conductor 4.

The housing assembly 10 further includes a grounding device 30 having an actuation assembly 32, a static grounding contact assembly 34, and a biasing device 36. The grounding device 30 is structured to temporarily couple, and place in electrical communication, the roll-out electrical component 1 at least one contact 2 and the ground connection 20 at a point wherein the roll-out electrical component at least one contact 2 is separated from the external voltage source conductor 4. That is, the grounding device 30 is structured to temporarily couple, and place in electrical communication, the roll-out electrical component 1 at least one contact 2 and the ground connection 20 as the roll-out electrical component 1 moves between the roll-out electrical component 1 first position to the roll-out electrical component 1 second position. When the roll-out electrical component 1 at least one contact 2 and the ground connection 20 are coupled, any static charge on the roll-out electrical component 1 will be discharged through the ground connection 20. Preferably, the roll-out electrical component at least one contact 2 and the ground connection 20 are coupled at the roll-out electrical component 1 intermediate position. Thus, when the roll-out electrical component 1 is being withdrawn from the housing assembly 10, any static charge on the roll-out electrical component 1, and especially any charge on the roll-out electrical component 1 at least one contact 2, will be discharged prior to the roll-out electrical component 1 at least one contact 2 being exposed. Further, as the roll-out electrical component 1 is being moved into the housing assembly 10, preferably in a continuous motion, the grounding device 30 will cause any charge on the roll-out electrical component 1 to be discharged just before the roll-out electrical component at least one contact 2 engages the external voltage source conductor 4.

The actuation assembly 32 is structured to be actuated, that is, engaged or disengaged, by the roll-out electrical component 1 as the roll-out electrical component 1 moves from the roll-out electrical component 1 first position to the roll-out electrical component 1 second position, preferably at the intermediate position. Additionally, in the preferred embodiment, the actuation assembly 32 is engaged by the roll-out electrical component 1 as the roll-out electrical component 1 is being inserted into the housing assembly 10 and disengaged by the roll-out electrical component 1 as the roll-out electrical component 1 is being removed from the housing assembly 10. In one embodiment, the actuation assembly 32 includes a drive ramp member 40 and a link member 42. The drive ramp member 40 is pivotally coupled to the housing assembly 10 at a drive ramp member pivot point 44. The drive ramp member 40 is disposed in the path of travel of the roll-out electrical component 1. In one embodiment, the drive ramp member 40 has a generally flat, thin body 50 having a thin longitudinal edge 52, a first end 54 and a second end 56. With this shape, the drive ramp member 40 may be disposed immediately adjacent to one of the housing assembly rails 16 with the drive ramp member body thin longitudinal edge 52 being disposed immediately adjacent to the rail upper surface 18. Preferably, the drive ramp member pivot point 44 is located on the drive ramp member body first end 54. The drive ramp member body 50 is disposed with the drive ramp member body second end 56 adjacent to the housing assembly back sidewall 12B and the drive ramp member body first end 54 extending into the housing assembly enclosed space 14.

Figure 3:
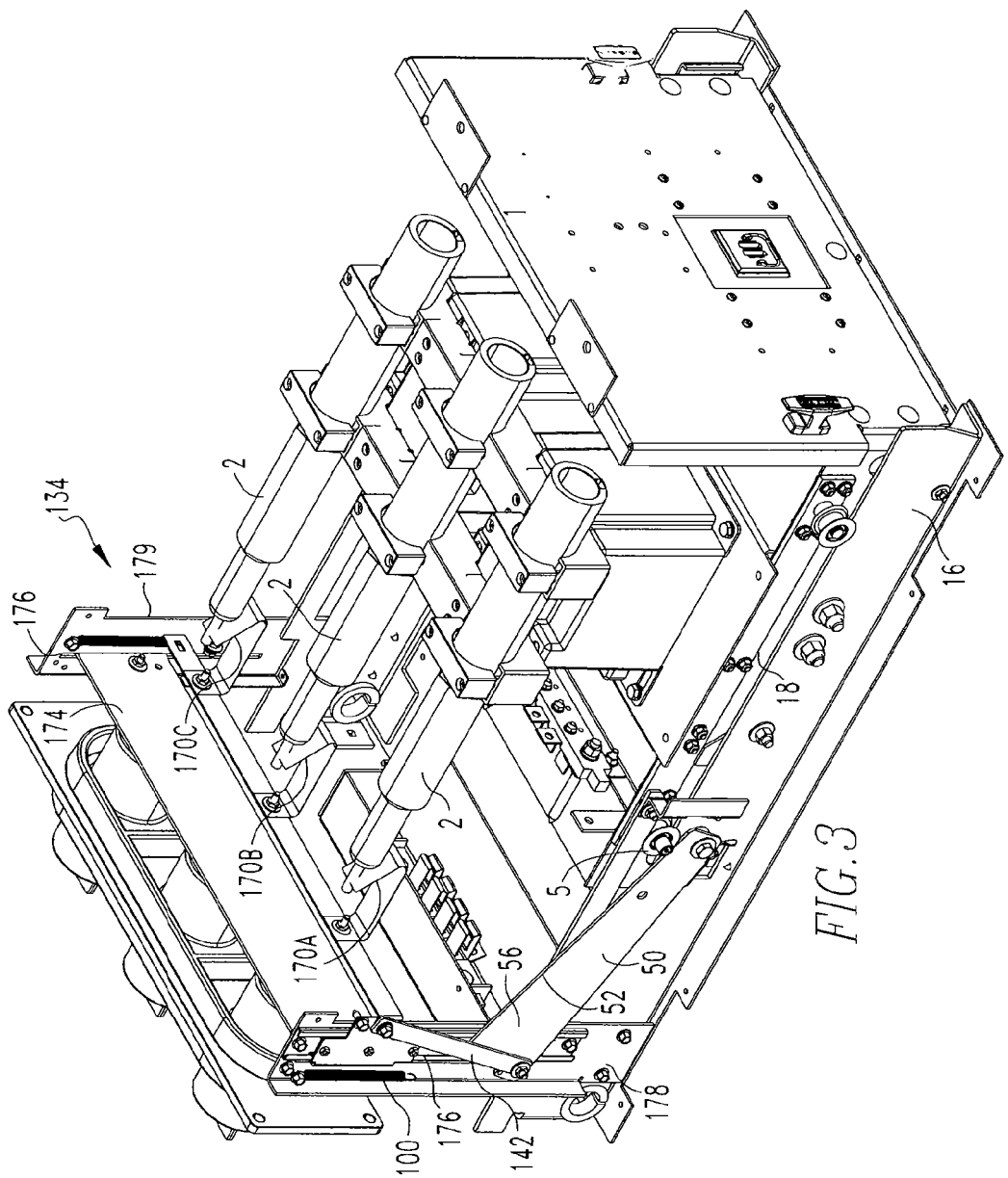
FIG. 3 is an isometric view of an alternate embodiment

As shown in FIGS. 1A-1D, in this configuration, the drive ramp member 40 is structured to move between two positions. In a first position (FIG. 1A), the drive ramp member body 50 is substantially parallel to a housing assembly rails 16 with the drive ramp member body thin longitudinal edge 52 being substantially parallel the rail upper surface 18. Preferably, the wheel 3 located adjacent to the back sidewall 12B rests on top of both the rail 16 and the ramp member body 50, thereby causing the ramp member body 50 to extend generally parallel to the adjacent rail 16. Alternately, as shown in FIG. 3, the wheel 3 may have an extension 5 that engages the thin longitudinal edge 52 of the ramp member body 50. In a second position (FIG. 1C), the drive ramp member body 50 is pivoted so that the drive ramp member body 50 is disposed at an angle relative to the housing assembly rails 16. That is, with the drive ramp member pivot point 44 being located with the housing assembly enclosed space 14 and the drive ramp member body second end 56 free to move, while in the drive ramp member 40 second position, the drive ramp member body 50 extends at an angle upwardly from the drive ramp member body first end 54 to the drive ramp member body second end 56.

The link member 42 has a first end 60 and a second end 62. The link member first end 60 is pivotally coupled to drive ramp member 40. Preferably, the link member first end 60 is spaced from the drive ramp member pivot point 44 by between about 2.0 and 9.0 inches, and more preferably about 3.0 inches. The link member second end 62 is coupled to the static grounding contact assembly 34. The link member second end 62 may be electrically insulated from the static grounding contact assembly 34. The link member 42, preferably, extends at an angle between fifty and ninety degrees relative to the drive ramp member 40. In this configuration, the link member 42 travels in a direction generally tangent to the path of travel of the drive ramp member 40 as the drive ramp member 40 moves between the drive ramp member 40 first position and the drive ramp member 40 second position.

The static grounding contact assembly 34 includes at least one static grounding contact member 70 and may include a fixed support 72 or a movable support member 174, 274, described below. In a first embodiment, the fixed support 72 is coupled to the housing assembly 10 and the at least one static grounding contact member 70 is pivotally coupled thereto. Alternatively, the at least one static grounding contact member 70 could be pivotally coupled directly to the housing assembly 10. The at least one static grounding contact member 70 is structured to move between a first position, wherein the static grounding contact member 70 does not contact the roll-out electrical component 1 at least one contact 2, and a second position, wherein the static grounding contact member 70 contacts, and is in electrical communication with, the roll-out electrical component 1 at least one contact 2. That is, the static grounding contact member 70 has an elongated body 80 having a first end 82, a medial portion 84 and a second end 86. A static grounding contact member pivot point 88 is located on the static grounding contact member medial portion 84. The link member second end 62 is coupled to the static grounding contact member first end 82. Further, the at least one static grounding contact member 70 is coupled to, and in electrical communication with, the housing assembly ground connection 20. The static grounding contact member second end 86 is structured to contact, and be in electrical communication with, the roll-out electrical component at least one contact 2.

Figure 1C:
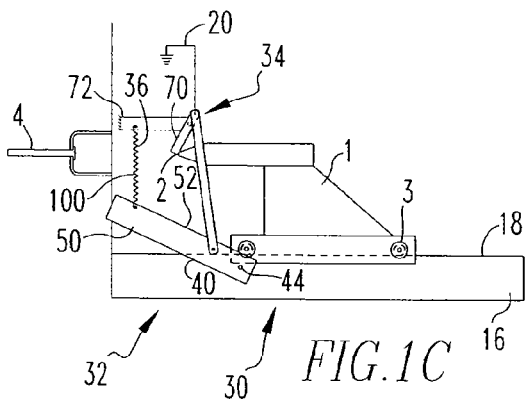
Figure 1D:
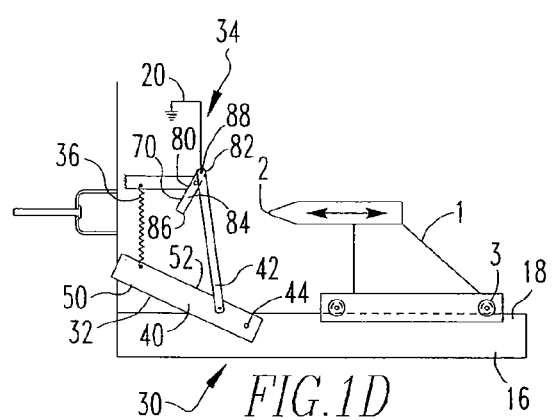

Accordingly, in this configuration, as the link member 42 moves in response to the drive ramp member 40, the link member 42 causes the static grounding contact member 70 to pivot about the static grounding contact member pivot point 88. Preferably, the actuation assembly 32 is structured to cause the at least one static grounding contact member 70 to contact the roll-out electrical component at least one contact 2 when the roll-out electrical component 1 is in the intermediate position, as shown in FIG. 1C. Thus, the static grounding contact member 70 is structured to move between a first position (FIG. 1A), wherein the static grounding contact member 70 does not contact the roll-out electrical component 1 at least one contact 2, and a second position (FIG. 1C), wherein the static grounding contact member 70 contacts, and is in electrical communication with, the roll-out electrical component 1 at least one contact 2, the static grounding contact member 70 being in the first position when the roll-out electrical component 1 is in the first, installed position, the at least one static grounding contact member 70 being in the second position when the roll-out electrical component 1 is in the intermediate position. As the roll-out electrical component 1 moves to the second position (FIG. 1D) the at least one contact 2 moves generally horizontally away from, and out of electrical communication with, the at least one static grounding contact member 70. When the roll-out electrical component 1 has more than one roll-out electrical component contacts 2, multiple static grounding contact members 70 may be coupled together by a lateral link 79 which extends generally perpendicular to the rails 16 and which is coupled to each static grounding contact member first end 82.

Figure 2:
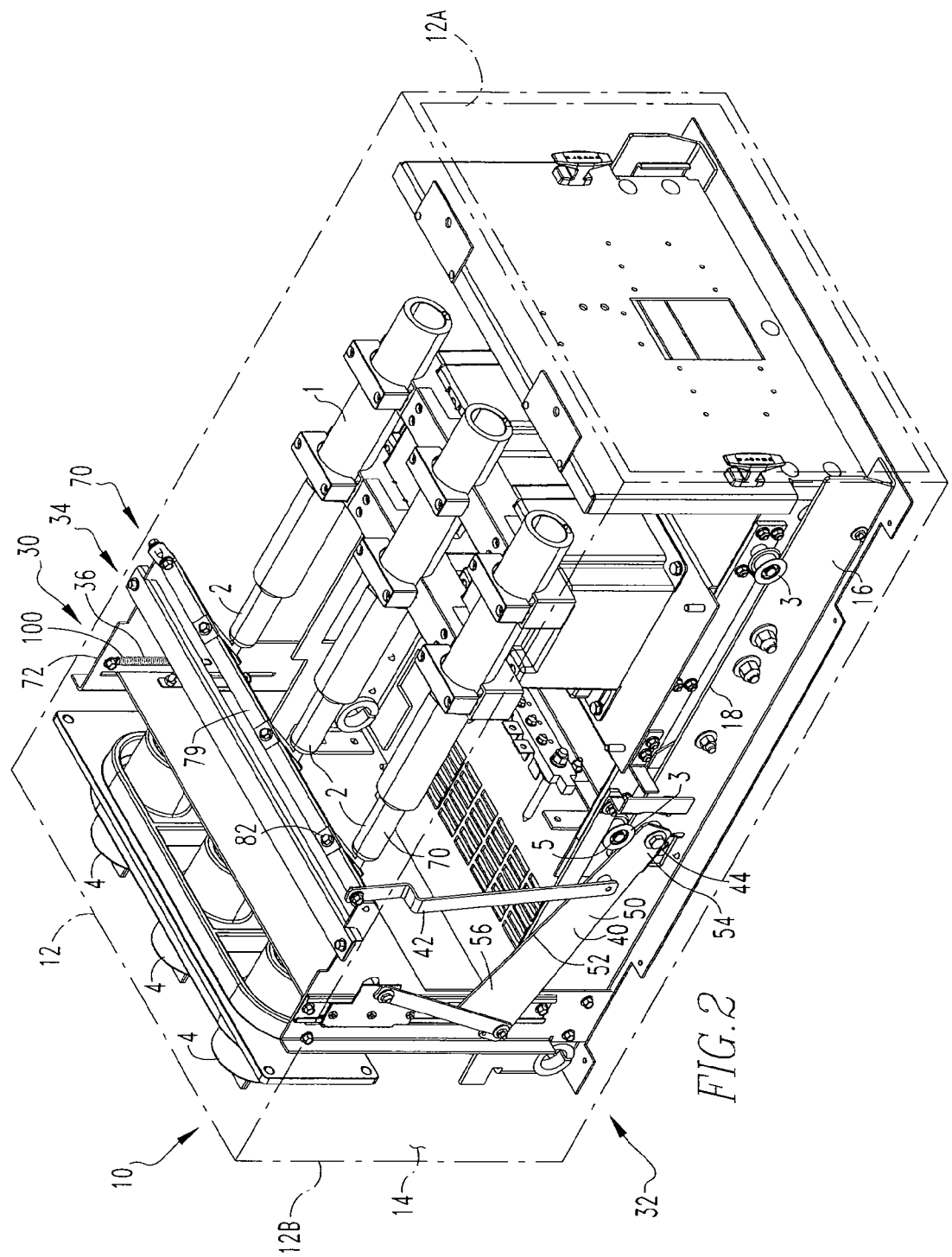
FIG. 2 is isometric view of one embodiment corresponding to the schematic shown in FIGS. 1A-1D.

The actuation assembly 32 and the static grounding contact assembly 34 are, preferably, biased into their respective second positions by the biasing device 36. The biasing device 36 may be a coil spring 100. As shown in FIG. 2, the spring 100 may extend between the actuation assembly 32 and a fixed location such as, but not limited to, the grounding contact assembly fixed support 72. Alternatively, the spring 100 may extend between the grounding contact assembly 134, discussed below, and a location on the housing assembly 10. Further, the spring 100 may extend between elements of the same assembly, for example, between the drive ramp member 40 and the link member 42 (not shown). In such a configuration, the biasing device 36 will cause the grounding contact assembly 34, and more specifically the at least one static grounding contact member 70 to move into the second position as the roll-out electrical component 1 disengages the actuation assembly 32, and, the biasing device 36 will cause the grounding contact assembly 34, and more specifically the at least one static grounding contact member 70 to move into the first position as the roll-out electrical component 1 engages the actuation assembly 32.

In an alternate embodiment, shown in FIG. 3, a static grounding contact assembly 134 includes a movable support member which is a movable support member 174, that is, a sliding member, upon which the at least one static grounding contact member 170 is disposed. As many electrical components are three-phase components having a contact for each phase, this embodiment of the static grounding contact assembly 134 includes three static grounding contact members 170A, 170B, 170C. Each static grounding contact member 170A, 170B, 170C is structured to contact a different roll-out electrical component contact 2 on a three-phase roll-out electrical component 1. Further, in this embodiment, the static grounding contact assembly 134 includes a pair of opposed races 176, which may be disposed on frame members 178, 179, or may be incorporated into the housing assembly 10 (not shown). The movable support member 174 is structured to move between a first position, wherein the movable support member 174 is disposed below (not shown) the roll-out electrical component contacts 2, and a second position wherein the movable support member 174 is generally aligned with (FIG. 3) the roll-out electrical component contacts 2. The static grounding contact members 170A, 170B, 170C are positioned on the movable support member 174 so that, when the movable support member 174 is in the second position, the static grounding contact members 170A, 170B, 170C contact, and are in electrical communication with, the roll-out electrical component contacts 2.

The actuation assembly 32 and the biasing device 36 are structured in a substantially similar manner to the embodiment described above. However, in this embodiment, the link member 142 is disposed adjacent to the drive ramp member body second end 56. In this configuration, as a roll-out electrical component 1 moving into the housing assembly 10 engages the drive ramp member 40, the drive ramp member body second end 56 moves generally downward toward the rails 16 which, in turn, pulls the movable support member 174 into the second position.

Figure 4:
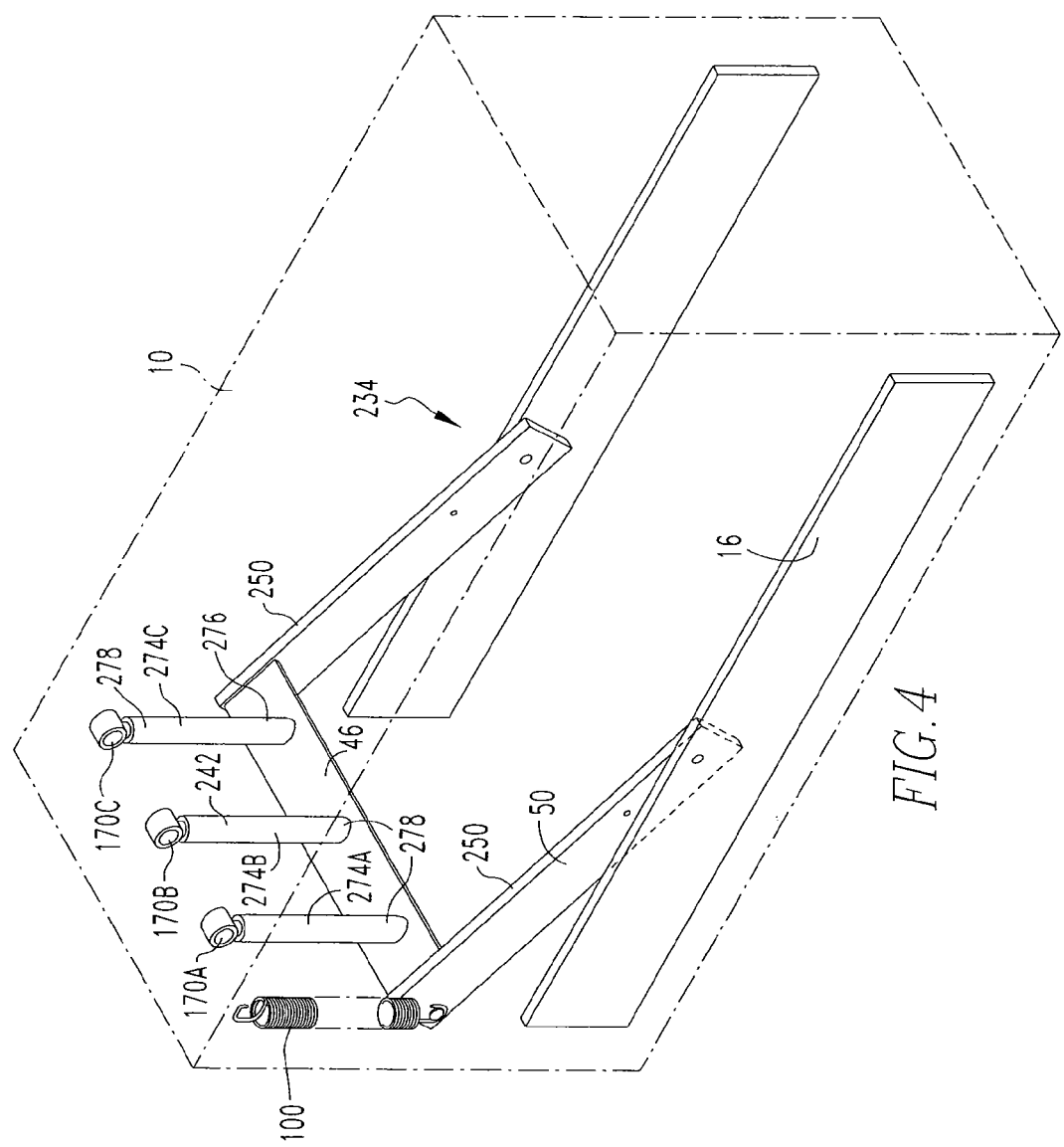
FIG. 4 is a schematic side view of another alternate embodiment.

In another alternate embodiment, shown in FIG. 4, a static grounding contact assembly 234 includes a movable support member 274 that is fixed to the actuation assembly 32 and which moves in a motion corresponding to the movement of the drive ramp members 40. That is, in this embodiment, the actuation assembly 32 includes two drive ramp members 40A, 40B, with each drive ramp member 40A, 40B disposed adjacent to the inner side each rail 16. The drive ramp members 40A, 40B, and their respective drive ramp member pivot point 44A, 44B, are generally aligned. In this configuration, the roll-out electrical component 1 will engage/disengage each drive ramp member 40A, 40B at substantially the point in time as the roll-out electrical component 1 moves between the first and second positions. In this embodiment, the actuation assembly 32 further includes a lateral support 46 extending between the drive ramp members 40A, 40B. In this embodiment, one or more movable support members 274 are fixedly coupled to the lateral support 46. That is, the one or more movable support members 274 do not rotate or pivot relative to the lateral support 46. As shown, there are three movable support members 274A, 274B, 274C, each having a first, proximal end 276 and a second, distal end 278. Each movable support member first, proximal end 276 is fixed to the lateral support 46. Alternatively, there may be a single, central link member 242 with a lateral movable support member 274 (not shown) disposed at the movable support member second, distal end 278 and extending laterally. When the actuation assembly 32 is in the second position, the movable support members 274A, 274B, 274C extend generally vertically to a point adjacent to the roll-out electrical component contacts 2. Thus, when the actuation assembly 32 is in the first position, and the drive ramp members 40A, 40B are extending generally parallel to the rails 16, the one or more movable support members 274 extend at an angle toward the housing assembly back sidewall 12B. In this position, the one or more movable support members 274 are out of the path of travel of the roll-out electrical component contacts 2.

In this embodiment, the static grounding contact members 170A, 170B, 170C (three shown) are disposed at the second, distal end 278 of each movable support members 274A, 274B, 274C. Thus, when the actuation assembly 32 is in the second position, and the movable support members 274A, 274B, 274C extend generally vertical to a point adjacent to the roll-out electrical component contacts 2, the static grounding contact members 170A, 170B, 170C will contact, and be in electrical communication with, each roll-out electrical component contact 2. As before, each static grounding contact member 170A, 170B, 170C is coupled to, and in electrical communication with, the housing assembly ground connection 20.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A grounding device for a roll-out electrical component housing assembly, said housing assembly having a ground connection, a pair of rails, and a plurality of sidewalls defining an enclosed space with an external voltage source conductor extending into said enclosed space, one said sidewall structured to move thereby allowing access to said enclosed space and allowing said roll-out electrical component to be removed from said enclosed space, said rails disposed in said enclosed space, said roll-out electrical component having at least one contact structured to be coupled to, and in electrical communication with, said external voltage source conductor, and said roll-out electrical component structured to move on said rails between a first, installed position, wherein said roll-out electrical component is disposed within said enclosed space and coupled to said external voltage source conductor, an intermediate position, wherein said roll-out electrical component is partially disposed in said enclosed space and is not coupled to said external voltage source conductor, and a second position, wherein said roll-out electrical component is not substantially disposed within said enclosed space and is not coupled to said external voltage source conductor, said grounding device comprising:
an actuation assembly structured to be engaged/disengaged by said roll-out electrical component and structured to move between a first position and a second position, said actuation assembly being in said first position when said roll-out electrical component is in said first, installed position, said actuation assembly being in said second position when said roll-out electrical component is in said intermediate position;
a static grounding contact assembly having at least one static grounding contact member structured to move between a first position, wherein said static grounding contact member does not contact said roll-out electrical component at least one contact, and a second position, wherein said static grounding contact member contacts, and is in electrical communication with, said roll-out electrical component at least one contact, said static grounding contact member being in said first position when said roll-out electrical component is in said first, installed position, said static grounding contact member being in said second position when said roll-out electrical component is in said intermediate position;
said static grounding contact assembly coupled to said actuation assembly and said housing assembly ground connection; and
a biasing device, said biasing device structured to bias said actuation assembly and said static grounding contact member to their respective first positions.

2. The grounding device of claim 1 wherein said at least one static grounding contact member is pivotally coupled to said housing assembly and is structured to pivot between said static grounding contact member first position and said static grounding contact member second position.

3. The grounding device of claim 1 wherein said static grounding contact assembly includes a pair of aligned, opposed races and said static grounding contact assembly includes an elongated movable support member extending between, and slidably disposed within, said races.

4. The grounding device of claim 1 wherein:
said static grounding contact assembly includes a movable support member;
said movable support member having a first, proximal end and a second, distal end;
said movable support member first, proximal end fixed to said actuation assembly; and
said grounding contact member disposed at said movable support member second, distal end.

5. The grounding device of claim 1 wherein:
said actuation assembly includes a drive ramp member and a link member;
said drive ramp member being pivotally coupled to said housing assembly at a drive ramp member pivot point;
said drive ramp member being disposed in the path of travel of said roll-out electrical component;
said link member having a first end and a second end, said link member first end pivotally coupled to said drive ramp member, said link member first end being spaced from said drive ramp member pivot point;
said link member second end coupled to said static grounding contact assembly; and
wherein, as said roll-out electrical component moves between said roll-out electrical component first position and said roll-out electrical component second position, said roll-out electrical component engages/disengages said drive ramp member causing said drive ramp member to move pivotally relative to said housing assembly and said link member to move generally linearly relative to said housing assembly.

6. The grounding device of claim 5 wherein said housing assembly rails have an upper surface, said roll-out electrical component includes a plurality of wheels structured to travel over said upper surface of said housing assembly rails, and wherein:
said drive ramp member has a generally flat, thin body having a thin longitudinal edge; and
said drive ramp member body thin longitudinal edge being disposed immediately adjacent to said upper surface of one said housing assembly rail and structured to be engaged by one said roll-out electrical component wheel as said roll-out electrical component travels along said one said housing assembly rail.

7. The grounding device of claim 6 wherein said at least one static grounding contact member is pivotally coupled to said housing assembly and is structured to pivot between said static grounding contact member first position and said static grounding contact member second position.

8. The grounding device of claim 6 wherein said static grounding contact assembly includes a pair of aligned, opposed races and said static grounding contact assembly includes an elongated movable support member extending between, and slidably disposed within, said races.

9. The grounding device of claim 1 wherein:
said actuation assembly includes a drive ramp member, and a link member;
said drive ramp member being pivotally coupled to said housing assembly at a drive ramp member pivot point;
said drive ramp member being disposed in the path of travel of said roll-out electrical component;
said static grounding contact assembly includes a movable support member;
said movable support member having a first, proximal end and a second, distal end;
said movable support member first, proximal end fixed to said drive ramp member;
said movable support member extending toward said roll-out electrical component at least one contact; and
said grounding contact member disposed at said movable support member second, distal end.

10. The grounding device of claim 1 wherein said biasing device is a spring coupled to said actuation assembly.

11. A housing assembly for a roll-out electrical component, said roll-out electrical component having at least one contact structured to be coupled to, and in electrical communication with, an external voltage source conductor, said housing assembly comprising:
a plurality of sidewalls defining an enclosed space, one said sidewall structured to move thereby allowing access to said enclosed space and allowing said roll-out electrical component to be removed from said enclosed space, said external voltage source conductor extending into said enclosed space;
a ground connection;
a pair of rails disposed in said enclosed space, said roll-out electrical component structured to move on said rails between a first, installed position, wherein said roll-out electrical component is disposed within said enclosed space and coupled to said external voltage source conductor, an intermediate position, wherein said roll-out electrical component is partially disposed in said enclosed space and is not coupled to said external voltage source conductor, and a second position, wherein said roll-out electrical component is not substantially disposed within said enclosed space and is not coupled to said external voltage source conductor;
a grounding device, having an actuation assembly, a static grounding contact assembly, and a biasing device;
said actuation assembly structured to be engaged/disengaged by said roll-out electrical component and structured to move between a first position and a second position, said actuation assembly being in said first position when said roll-out electrical component is in said first, installed position, said actuation assembly being in said second position when said roll-out electrical component is in said intermediate position;
said static grounding contact assembly having at least one static grounding contact member structured to move between a first position, wherein said static grounding contact member does not contact said roll-out electrical component at least one contact, and a second position, wherein said static grounding contact member contacts, and is in electrical communication with, said roll-out electrical component at least one contact, said static grounding contact member being in said first position when said roll-out electrical component is in said first, installed position, said static grounding contact member being in said second position when said roll-out electrical component is in said intermediate position;
said static grounding contact assembly coupled to said actuation assembly and said housing assembly ground connection; and
said biasing device structured to bias said actuation assembly and said static grounding contact member to their respective first positions.

12. The housing assembly for a roll-out electrical component of claim 1 wherein said at least one static grounding contact member is pivotally coupled to said housing assembly and is structured to pivot between said static grounding contact member first position and said static grounding contact member second position.

13. The housing assembly for a roll-out electrical component of claim 11 wherein said static grounding contact assembly includes a pair of aligned, opposed races and said static grounding contact assembly includes an elongated movable support member extending between, and slidably disposed within, said races.

14. The housing assembly for a roll-out electrical component of claim 11 wherein:
said static grounding contact assembly includes a movable support member;
said movable support member having a first, proximal end and a second, distal end;
said movable support member first, proximal end fixed to said actuation assembly; and
said grounding contact member disposed at said movable support member second, distal end.

15. The housing assembly for a roll-out electrical component of claim 11 wherein:
said actuation assembly includes a drive ramp member, and a link member;
said drive ramp member being pivotally coupled to said housing assembly at a drive ramp member pivot point;
said drive ramp member being disposed in the path of travel of said roll-out electrical component;
said link member having a first end and a second end, said link member first end pivotally coupled to said drive ramp member, said link member first end being spaced from said drive ramp member pivot point;
said link member second end coupled said static grounding contact assembly; and
wherein, as said roll-out electrical component moves between said roll-out electrical component first position and said roll-out electrical component second position, said roll-out electrical component engages/disengages said drive ramp member causing said drive ramp member to move pivotally relative to said housing assembly and said link member to move generally linearly relative to said housing assembly.

16. The housing assembly for a roll-out electrical component of claim 15 wherein said housing assembly rails have an upper surface, said roll-out electrical component includes a plurality of wheels structured to travel over said upper surface of said housing assembly rails, and wherein:
said drive ramp member has a generally flat, thin body having a thin longitudinal edge; and
said drive ramp member body thin longitudinal edge being disposed immediately adjacent to said upper surface of one said housing assembly rail and structured to be engaged by one said roll-out electrical component wheel as said roll-out electrical component travels along said one said housing assembly rail.

17. The housing assembly for a roll-out electrical component of claim 16 wherein said at least one static grounding contact member is pivotally coupled to said housing assembly and is structured to pivot between said static grounding contact member first position and said static grounding contact member second position.

18. The housing assembly for a roll-out electrical component of claim 16 wherein said static grounding contact assembly includes a pair of aligned, opposed races and said static grounding contact assembly includes an elongated movable support member extending between, and slidably disposed within, said races.

19. The housing assembly for a roll-out electrical component of claim 11 wherein:
 said actuation assembly includes a drive ramp member, and a link member;
 said drive ramp member being pivotally coupled to said housing assembly at a drive ramp member pivot point;
 said drive ramp member being disposed in the path of travel of said roll-out electrical component;
 said static grounding contact assembly includes a movable support member;
 said movable support member having a first, proximal end and a second, distal end;
 said movable support member first, proximal end fixed to said drive ramp member;
 said movable support member extending toward said roll-out electrical component at least one contact; and
 said grounding contact member disposed at said movable support member second, distal end.

20. The housing assembly for a roll-out electrical component of claim 11 wherein said biasing device is a spring coupled to said actuation assembly.

* * * * *